United States Patent
Zuideveld

[15] 3,669,061
[45] June 13, 1972

[54] APPARATUS FOR APPLYING REACTIVE ADHESIVE

[72] Inventor: Reindert Zuideveld, Farnham, England

[73] Assignee: Van Leer (U.K.) Limited, London, England

[22] Filed: April 2, 1969

[21] Appl. No.: 812,594

[30] Foreign Application Priority Data

April 2, 1968 Great Britain..................15,824/68

[52] U.S. Cl...................................118/7, 118/262, 118/608
[51] Int. Cl............................................B05c 1/08, B05c 11/10
[58] Field of Search..............118/259, 262, 608, 7; 137/209; 101/350

[56] References Cited

UNITED STATES PATENTS

| | | |
|---|---|---|
| 2,605,684 | 8/1952 | Nagels et al........................118/262 X |
| 3,098,437 | 7/1963 | Tyma et al.............................101/350 |
| 1,838,112 | 12/1931 | Rundell...............................118/259 X |
| 2,606,520 | 8/1952 | Hoel....................................118/262 X |
| 2,676,563 | 4/1954 | Montgomery et al..............118/262 X |
| 2,711,713 | 6/1955 | Czarnecki................................118/608 |
| 3,106,480 | 10/1963 | Baker..................................118/259 X |

*Primary Examiner*—John P. McIntosh
*Attorney*—Wolfe, Hubbard, Leydig, Voit & Osann, Ltd.

[57] ABSTRACT

An apparatus is provided for applying a reactive-curing multiple-component adhesive to a rapidly moving web of non-porous material. The components are fed in a predetermined proportion to an application roller and an additional roller rotating at different circumferential velocities. The components are thereby intimately admixed under shear and kneading action, fresh adhesive is constantly mixed with older increments of adhesive, and cobwebbing of older increments of adhesive is thus reduced or eliminated. A stereotype, or rotogravure, roller transfers the adhesive from the application roller to the surface to be coated.

6 Claims, 1 Drawing Figure

PATENTED JUN 13 1972
3,669,061
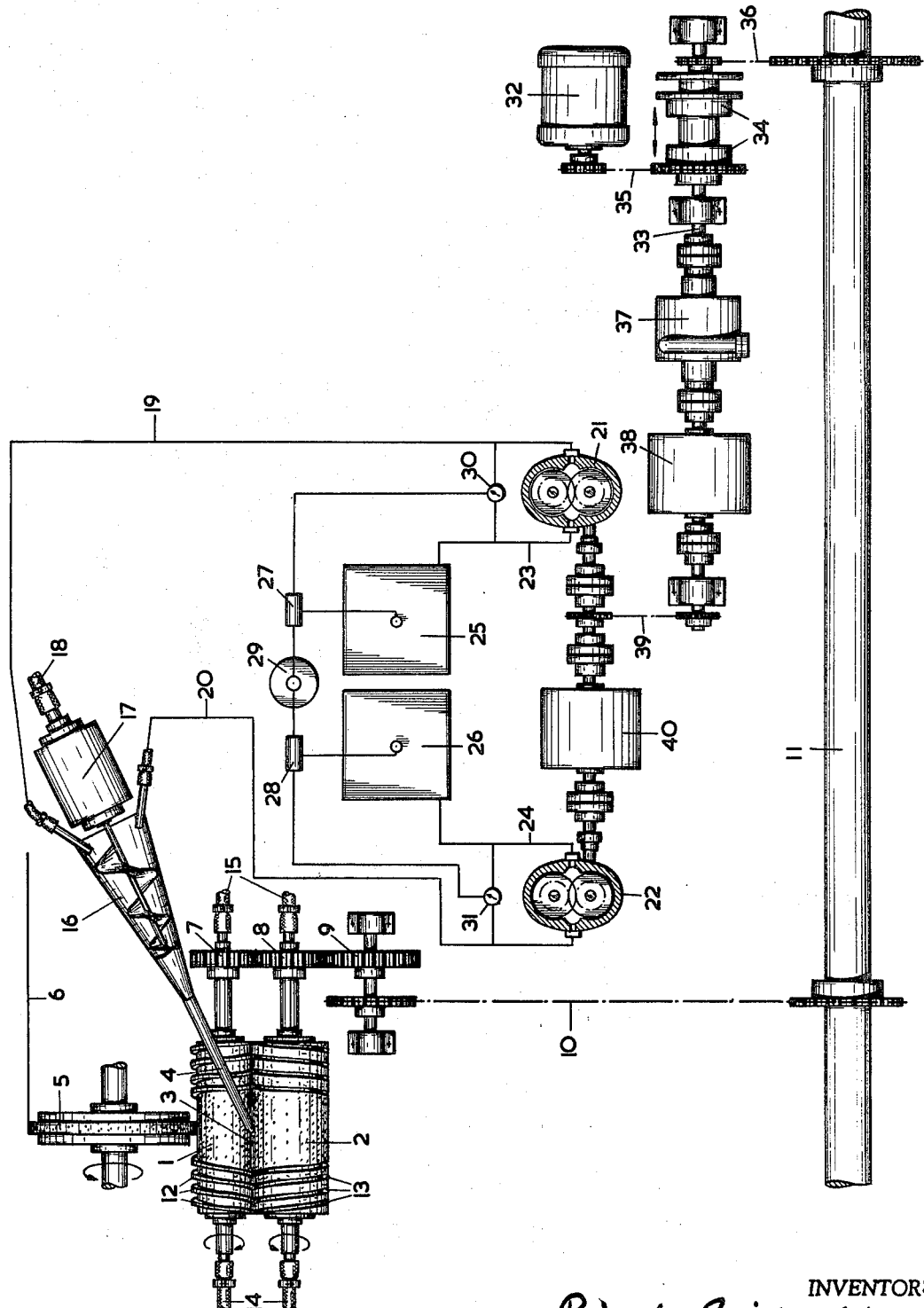
INVENTOR:-
Reinder Zuideveld,
BY Wolfe, Hubbard, Voit & Osann.
ATTORNEYS

APPARATUS FOR APPLYING REACTIVE ADHESIVE

FIELD

This invention relates to the application of adhesives onto various substrates, and more particularly concerns the application of a reactive-curing multiple-component adhesive to a rapidly moving web of non-porous material.

BACKGROUND

The application of an adhesive to a porous substrate offers few problems. With, for example, a substrate such as paper and a water-base adhesive such as an animal or vegetable glue, the water is readily and rapidly absorbed by the paper substrate or base.

When, however, the substrate is non-porous, an entirely different problem is presented. Water or other adhesive solvent is not readily, if at all, absorbed by the base. As a consequence, the adhesive cannot be dried simply by absorption. Consequently, either alternative adhesive drying procedures are required, or alternative adhesive systems must be used.

It has long been recognized that superior adhesion of non-porous material may afforded by various multiple-component adhesives. These comprise two or more components which are admixed at or near the point of application, and which upon mixing harden through chemical reaction. Typical of such adhesives are the urethanes, formed by mixing a polyisocyanate with a polyester or a polyether, following which the adhesive is cured by heat and/or catalysis. Adhesives composed of two or more components which react chemically to afford a bond are generally termed reactive-curing multi or multiple-component adhesives.

Although widely used, adhesives of this type give rise to serious operational difficulties. Coating speeds of several hundred feet per minute are quite common, which requires that the adhesive components be selected so as to cure virtually instantaneously after mixing. This however produces an adhesive which begins to cure and harden even before it is applied to the web or substrate. The adhesive must therefore be removed promptly from applicator surfaces at the risk of clogging the applicator, forming stringy cobwebs, and producing an uneven and hence unacceptable adhesive coating.

A primary object of the invention is to provide apparatus for applying reactive-curing multiple-component adhesive to rapidly moving webs of non-porous material by a system which intimately mixes the components with each other, mixes freshly-made adhesive with older increments of the adhesive to thereby dilute the same, and reduces or eliminates undesirable premature hardening and cobwebbing of rapid-cure adhesives. Other and more specific objects will be apparent as the description of this invention proceeds.

While the invention will be described in connection with preferred embodiments, it will be understood that it is not intended to limit the invention thereto, but on the contrary it is intended to cover all modifications and alternative constructions falling within the spirit and scope of the invention as broadly expressed.

BRIEF DESCRIPTION OF DRAWING

The invention will become further evident in conjunction with the annexed drawing showing a diagrammatic top view of an embodiment according to the invention.

DETAILED DESCRIPTION

In accordance with the invention, a system is provided for applying reactive-curing multiple-component adhesives to rapidly moving webs, or substrates, of a material having an adhesive-receiving non-porous surface. The herein-described invention is thus particularly suitable for applying adhesives to organic plastics, plastic-coated paper, metal foil, or the like.

To this end, the adhesive may be any of the available multiple-component types which cure or harden by chemical reaction between the components, either alone or in the presence of heat and/or catalysis. Many such reactive-curing adhesives are known and, as their composition forms no part of the present invention, will not be described further.

In keeping with the invention, and with reference to the drawing, a strip or web 6 of organic plastic sheeting, which is to be edge-coated with a reactive adhesive, is passed downwardly of a stereotype, or rotogravure, roller 5, which is driven at a circumferential velocity equal to the linear velocity of the web 6. The stereotype roller 5 is coated with the mixed multiple-component adhesive, supplied as hereinafter described, and thereby deposits adhesive from the roller 5 surface onto the edge of the web 6.

Adhesive is supplied to the stereotype roller 5 from an applying or application roller 1. This applying roller 1 is in adhesive-transferring contact with the stereotype roller 5; that is, the two are placed sufficiently close such that adhesive on the surface of applying roller 1 is transferred, at least in part, to the stereotype roller 5.

The applying roller 1 and the stereotype roller 5 are rotated in opposite directions at substantially the same circumferential velocities. This however is not essential, and under particular circumstances the velocities need not be equal.

In keeping with the invention, an additional or counter roller 2 is provided. This likewise is in adhesive-transferring contact with the applying roller 1, and as in the case of the contact distance between the applying roller 1 and the stereotype roller 5, depends on such factors as the roller sizes, materials, and speeds, and on the viscosity and tenacity of the adhesives.

The counter roller 2, in contrast to conventional practice, is rotated at a circumferential velocity different from that of the applying roller 1. The relative circumferential velocities are advantageously within the range of about 1.1:1 to about 5:1, and either the applying roller 1 or the counter roller 2 may be the one having the higher velocity. The optimum relative circumferential velocities appear to be in the range of about 1.5:1 to about 1.7:1.

The difference in circumferential velocities between the applying roller 1 and the counter roller 2 may be effected in several ways. For example, the applying roller 1 and the counter roller 2 may be of different diameters, as shown in the drawing, and are rotated in opposite directions at equal angular velocities. Conversely, the rollers may be of equal diameters but rotated at different angular velocities. A combination may be used: different diameters as well as different numbers of revolutions per unit time. Alternatively, the applying roller 1 and the counter roller 2 may be rotated in the same direction.

The several rollers above discussed may be made of any material suitable for use with the adhesive in question. The rollers may either be of rigid material, as for example metal, or may be of a flexible resilient material such as silicone or synthetic rubber. Different materials may be used for the different rollers.

To facilitate rapid reaction and curing of the adhesive components, the applying roller 1 and the counter-roller 2, and optionally the stereotype roller 5, may be internally heated. As shown in the drawing, heat may be applied from steam inlet conduits 14 to the hollow centers of the rollers 1 and 2, and condensate may be withdrawn from the outlet conduits 15 from the respective rollers.

As shown in the drawing, the applying roller 1 is driven by gear wheel 7 and the counter roller 2 is driven by a meshing gear wheel 8. The latter wheel is in turn driven by a gear wheel 9, connected via a schematic chain or other link work transmission 10 to the main driving shaft 11 of the apparatus.

The two individual components of the adhesive, with or without prior mixing, are supplied in a constant predetermined proportion to the adhesive-transferring portion, or nip 3, between the applying roller 1 and the counter-roller 2, either directly or by feeding the components onto one or the other of the rollers. In the embodiment depicted, the two-component reactive-curing adhesive is pre-mixed in a mixing mechanism 16, which is of the type having a conical mixing plenum and a rotating spiral blade, the latter driven by an air motor 17 supplied with compressed air via conduit 18. Thus, one adhesive component is supplied to the plenum of the mixing mechanism 16 via conduit 19, while the other component is supplied via conduit 20. The conduits are thus pre-mixed in the plenum and discharged from the mixing mechanism 16 through the nozzle 4 into the contact region between the applying roller 1 and the counter roller 2.

When the adhesive components are discharged onto the rollers 1 and 2, the differential velocities at the surfaces of the respective rollers cause a shearing and kneading which effect rapid mixing of the freshly supplied adhesive components. This is manifestly favorable with respect to providing a final adhesive of uniform characteristics. In addition, the freshly supplied adhesive is constantly mixed with older increments of adhesive which may remain on the rollers 1, 2, and/or 5 so that the older adhesive is prevented from solidifying excessively. As a consequence, the formation of solid adhesive deposits on the apparatus and, more importantly, the formation of stringy but hard cobwebs in the apparatus are reduced or eliminated.

Since reactive-curing adhesives rely for the most part on a chemical reaction between the adhesive-forming component, it is generally desirable to control closely the relative proportions or ratios of the several components. A system shown in the annexed drawing is eminently suitable for this, and has the outstanding feature of inherently compensating for differing or varying viscosities of the several components and for uneven wear of the pumps.

Referring to the drawing, a pair of component containers 25, 26 is provided, each enclosed and each provided with an inert gas such as nitrogen, supplied via source 29. Inlet conduits 23, 24 communicate from the outlets of containers 25, 26 respectively to a pair of positive displacement gear-type pumps 21, 22, respectively. These in turn communicate via component conduits 19 and 20 to the mixing mechanism 16, described previously.

A pair of pressure differential gages 30, 31 are disclosed across the inlet and outlet of each ear pump 20, 22, respectively, to indicate the pressure difference across each of the pumps. These differential pressure gages 30, 31 control inert gas pressure-control valves 27, 28, feeding inert gas respectively into containers 25, 26. Accordingly, should there be any variation in pump discharge pressure, as for example resulting from pump wear or viscosity changes in the liquid components, the differential pressure gages 30 or 31 detect this and adjust the pressure upstream of their respective gear pumps 21, 22 to restore a constant pressure differential across each of the pumps.

Although the proportion or ratio maintaining system above is exceptionally precise, under certain circumstances it may not be necessary to insure such precise control of component flow. In this event, the inert gas pressuring system and the differential pressure maintaining system as described above may be eliminated, relying instead on the generally constant flow rate characteristics of positive displacement pumps 21, 22.

The pumps 21, 22 may be driven either by the main shaft 11 of the apparatus or by a separate electric motor 32 via the transmission 35, which in turn is directly linked to the motor 32. For the former case, the driven shaft 33 may be connected via the transmission 36 to the main shaft 11.

Irrespective of power source, the driven shaft 33 drives a transmission 39 through a variator 37 and reduction gearing 38 for control of shaft speed. In turn, the transmission 39 drives pump 21 and, through suitable speed-selecting gearing 40, pump 22.

The system as described is an essentially complete apparatus for applying a reactive-curing multiple component adhesive to non-porous materials, which contact the stereotype roller 5 at speeds of several hundred feet per minute, and indeed at speeds higher than 200 meters per minute. Cure times of less than a second or so may be accommodated without difficulty. Further, for special purposes other modifications may be incorporated. For example, the applying roller may be provided with a series of helical fins 12 which direct the adhesive inwardly toward the region of the stereotype roller 5, it being understood that the height of the fins or lands does not exceed the nip 3 or distance between the rollers 1 and 2. Some additional tolerance is provided in the event the counter roller 2 is of a flexible material while the applying roller 1 is rigid, in which case the fins or lands may press rather firmly against the counter roller 2.

There has therefore been provided, according to the invention, a unique yet simple and effective apparatus for applying adhesives under conditions which permit full advantage to be taken of high speed reactive curing multiple-component adhesives.

I claim as my invention:

1. Apparatus for applying a reactive-curing multiple-component adhesive to a rapidly moving web of non-porous material, comprising:
   a. a stereotype roller for depositing adhesive onto said non-porous material,
   b. an application roller in adhesive-transferring contact with said stereotype roller,
   c. an additional roller in adhesive-transferring contact with said application roller,
   d. means for supplying the multiple components of said adhesive in predetermined proportion to the adhesive-transferring contact region between said application roller and said additional roller,
   e. means for rotating said application roller and said additional roller at different circumferential velocities so that said multiple components are intimately admixed under shear and kneading action, fresh adhesive is constantly mixed with older increments of adhesive, and cobwebbing of rapidly-curing older increments of said adhesive is thereby reduced or eliminated, and
   f. said means for supplying the components of said adhesive including;
      an enclosed container for each of said liquid components,
      conduit means from each of said containers to the outlet of said supplying means,
      pump means in each of said conduit means,
      means for supplying pressurized gas to each of said containers, and
      means responsive to the pressure difference across each of said pump means for controlling the gas pressure in each of said containers to thereby maintain a constant pressure differential across each of said pump means and correspondingly a constant predetermined ratio of said components.

2. Apparatus of claim 1 wherein said ratio of circumferential velocities is between about 1.1:1 to 5:1.

3. Apparatus of claim 1 wherein said application roller and said additional roller are of different diameters, and are rotated in opposite directions at equal angular velocities.

4. Apparatus of claim 1 wherein said application roller and said additional roller are of equal diameters, and are rotated in opposite directions at different angular velocities.

5. Apparatus of claim 1 wherein said ratio of said circumferential velocities is between about 1.5:1 and 1.7:1.

6. Apparatus for applying a reactive-curing component adhesive to a rapidly moving web of non-porous material, comprising:
   a. a stereotype roller for depositing adhesive onto said non-porous material,
   b. an application roller in adhesive-transferring contact with said stereotype roller,
   c. an additional roller in adhesive-transferring position with respect to said application roller,
   d. means for supplying the multiple components of said adhesive in predetermined proportion to the adhesive-transferring region between said application and said additional roller, e. means for rotating the said application roller and said additional roller at different circumferential velocities for intimately admixing said multiple components under shear and kneading action, and f. at least one of said application and additional rollers having helical means for directing the adhesive towards the region of contact between the application roller and stereotype roller, said helical means being disposed adjacent the opposite ends of the roller containing the same, the central portion of said roller being free of said helical means and the helical means on each end of said roller being such that the direction of advance upon rotation of the roller is toward the center of the roller.

* * * * *